United States Patent [19]
Eberle et al.

[11] 3,762,376
[45] Oct. 2, 1973

[54] ROTARY COMBUSTION ENGINE POWER CONTROL

[75] Inventors: Meinrad K. Eberle, Sterling Heights; Edward D. Klomp, Mt. Clemens, both of Mich.

[73] Assignee: General Motors Corporation, Detroit, Mich.

[22] Filed: Feb. 2, 1972

[21] Appl. No.: 222,792

[52] U.S. Cl............ 123/8.01, 123/8.05, 123/8.07, 123/8.45, 123/8.09
[51] Int. Cl............................................ F02b 53/06
[58] Field of Search............... 123/8.01, 8.05, 8.07, 123/8.13, 8.45

[56] References Cited
UNITED STATES PATENTS

| | | | |
|---|---|---|---|
| 3,637,332 | 1/1972 | McAnally | 123/8.05 |
| 3,347,213 | 10/1967 | Froede | 123/8.45 |
| 3,412,716 | 11/1968 | Tausch | 123/8.45 |
| 3,476,092 | 11/1969 | Yamamoto | 123/8.07 X |

*Primary Examiner*—Clarence R. Gordon
*Attorney*—J. L. Carpenter et al.

[57] ABSTRACT

A rotary combustion engine of the planetary rotor type having a variable intake port area providing variable power control.

3 Claims, 8 Drawing Figures

ROTARY COMBUSTION ENGINE POWER CONTROL

This invention relates to rotary combustion engine power control and more particularly to rotary combustion engines of the planetary rotor type having a variable intake port area providing power control.

In conventional rotary combustion engines of the planetary rotor type, it is common practice to provide a throttled air-fuel flow to control power as is the practice with conventional reciprocating piston combustion engines. In the case of piston engines, it is also known that this throttling function can be shifted to the engine's intake valves or that instead of such throttling, the power may be controlled by varying the time of closing of the intake valves. However, in rotary combustion engines of the planetary rotor type there are no valves as in the reciprocating piston engine and instead an intake port of constant area is periodically opened by the rotor to admit air-fuel mixture to each of the working chambers. Thus, the structure in a reciprocating piston combustion engine adaptive to these types of alternative power control is not be be found in rotary combustion engines of the planetary rotor type. Nevertheless we have found that the non-throttled type of power control wherein intake closing is controlled can be incorporated in a present commercial rotary combustion engine and in a simple manner.

The rotary combustion engine power control according to the present invention is incorporated in a rotary combustion engine of the planetary rotor type having a housing with a rotor cavity in which is disposed a rotor having a plurality of peripheral faces. An output shaft is rotatably supported by the housing and has an eccentric rotatably supporting the rotor. The rotor is geared to the housing to provide a speed ratio between the rotor and the output shaft so that the output shaft is caused to rotate as the rotor planetates with a fixed cyclic relationship. The rotor and the housing cooperatively provide a plurality of working chambers with these working chambers moving with the rotor within the housing and varying between a minimum volume and a maximum volume. An intake passage is provided for directing an air-fuel mixture to each working chamber and an exhaust passage is provided for directing the exhaust products therefrom. The intake passage has an intake port that is opened by the rotor to each working chamber during a chamber intake phase as the rotor planetates and is also openable by the rotor to the same working chamber during immediately subsequent chamber compression. An intake port area control member is slidably mounted in the housing to vary the area of the intake port at the opening to each working chamber. This control member is movable by the vehicle operator between a maximum power position in which the intake port has a predetermined open area and a minimum extent in the direction of rotor movement and is opened to each working chamber only during the intake phase as the chamber expands and a minimum power position in which the intake port has a predetermined larger open area and a maximum extent in the direction of rotor movement and remains open to the same working chamber during immediately subsequent compression. When the intake port area control member is thus in its minimum power position, part of the air-fuel mixture previously admitted to each working chamber during the intake phase is rejected back to the intake passage during the compression phase to effect minimum power and as the intake port area control member is moved towards its maximum power position, less rejection occurs until finally there is minimum air-fuel mixture rejection in which event there is provided maximum power. With such intake closing timing control it has been found that the advantages over conventional throttling are an improvement in thermal efficiency as a result of less pumping work, a reduction in NO production as a result of lower temperatures throughout the cycle and improved mixture homogeneity.

An object of the present invention is to provide a new and improved rotary combustion engine power control.

Another object is to provide in a rotary combustion engine of the planetary rotor type a variable intake port timing control to vary power.

Another object is to provide in a rotary combustion engine of the planetary rotor type an intake port control to vary the time during which the intake port remains open to each of the working chambers to vary power.

Another object is to provide in a rotary combustion engine of the planetary rotor type an intake port control for varying the extent to which the engine's intake port is open to each of the working chambers to vary the amount of air-fuel mixture in each working chamber for combustion.

Another object is to provide in a rotary combustion engine of the planetary rotor type an intake port control to control the extent of opening of an intake port to each working chamber wherein an intake port area control member is controlled by the vehicle operator to vary the area of the intake port at the opening to each working chamber between a maximum power position in which the intake port has a predetermined open area and a minimum extent in the direction of rotor movement and is open to each chamber only during chamber expansion and a minimum power position in which the intake port has a predetermined larger open area and a maximum extent in the direction of rotor movement and remains open to the same working chamber during immediately subsequent chamber compression.

These and other objects of the present invention will become more apparent from the following description and drawing in which.

Figure 1:
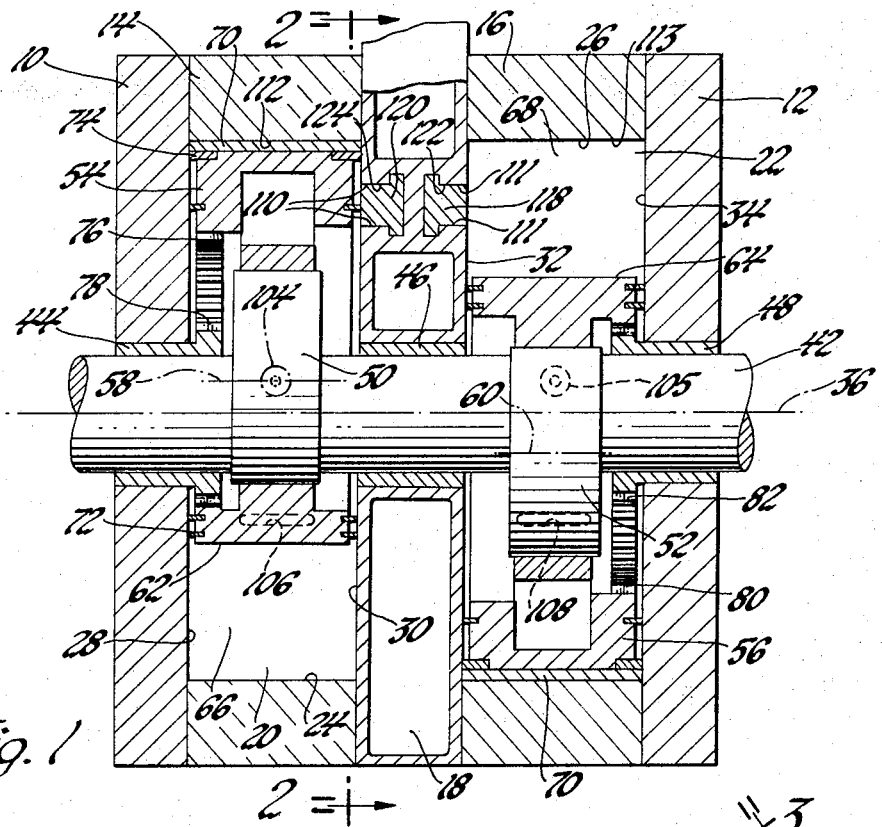
FIG. 1 is a longitudinal view with parts in section of a rotary combustion engine of the planetary rotor type having power control apparatus according to the present invention.
Figure 2:
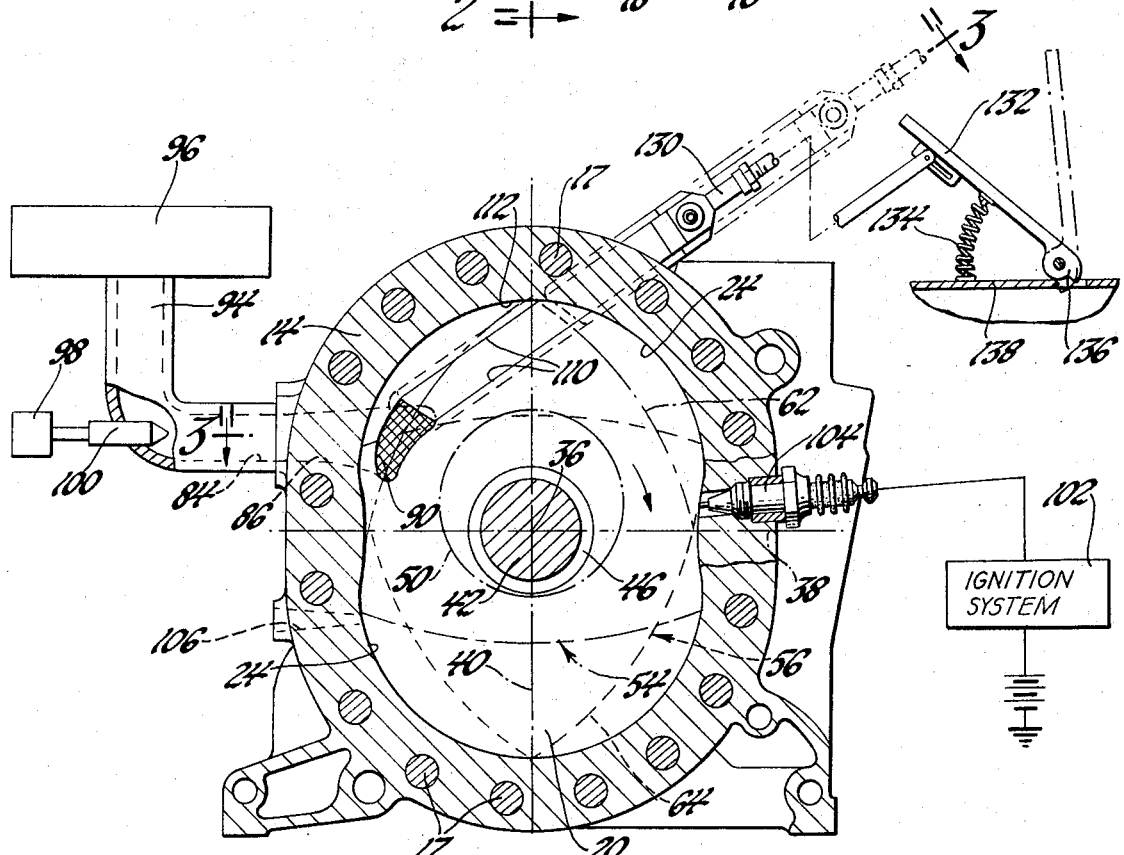
FIG. 2 is a reduced view taken on the line 2—2 of FIG. 1 further showing the power output control apparatus.

Referring to FIGS. 1 and 2, the rotary combustion engine power control according to the present invention is illustrated for use in an internal combustion rotary engine of the Wankel type having two rotors. The engine's stationary housing comprises a pair of end housings 10 and 12, a pair or rotor housings 14 and 16, and an intermediate housing 18 between the two housings 14 and 16, all clamped together by bolts 17. The engine housing has a pair of rotor cavities 20 and 22 that are respectively defined by inwardly facing peripheral walls 24 and 26 of rotor housings 14 and 16 and opposed, axially-spaced side walls 28, 30 and 32, 34 of the end housing 28 and intermediate housing 30 and the intermediate housing 34 and end housing 12. Each of the peripheral walls 24 and 26 is in the shape of a two-lobed epitrochoid or curve parallel thereto whose center line is indicated at 36 where the curve's minor axis 38 and major axis 40 intersect at right angles. An output shaft 42 which may also be called a crankshaft extends through the cavities 20 and 22 and is rotatably supported by sleeve bearings 44, 46 and 48 which are fixed in the end housing 10, intermediate housing 18, and end housing 12, respectively. The shaft 42 is arranged so that its axis is coincident with the center line 36 which is parallel to the peripheral walls 24 and 26.

The output shaft 42 is provided in the cavities 20 and 22 with eccentrics 50 and 52 on which rotors 54 and 56 are mounted for rotation about the eccentrics' axes 58 and 60, these axes being located 180° apart and spaced from and parallel to the output shaft axis 36. The rotors 54 and 56 have the general shape of a triangle with three faces 62 and 64 which are convex and face the peripheral walls 24 and 26 and cooperate therewith and with the side walls 28, 30 and 32, 34, respectively, to define three variable volume combustion or working chambers 66 and 68 that are spaced about the rotors and move with the rotors within the engine housing. Chamber sealing is provided by an apex seal 70 mounted at each apex or corner of each rotor, a side seal 72 mounted on each rotor side extending between each set of adjacent apex seals 70 and an intermediate button seal 74 providing a sealing link at the juncture of the side seals with each apex seal. The apex seals 70 continuously engage the peripheral walls and both the side seals and button seals engage the side walls with the complete seal arrangement acting to seal the working chambers. With the two-lobed peripheral wall and the three-lobed rotor, there are provided the four phases of intake, compression, expansion, and exhaust in each chamber in fixed relation to the housing by forcing the rotor to rotate at one-third the speed of the output shaft, and with like phases in the two cavities occurring 180° apart. This is accomplished by a pair of outboard located timing gear trains between each rotor and the engine housing. The gear train between the rotor 54 and the engine housing comprises an internally toothed ring gear 76 which is fixed to the rotor 54 on the outboard rotor side concentric with the rotor axis 58. Ring gear 76 meshes with an externally toothed gear 78 which is concentric with the output shaft axis 36 and is made stationary by being integral with the inboard end of the sleeve bearing 44. The ring gear 76 has one and one-half times the number of teeth as the gear 78 to provide the required ratio of 3:1 between the output shaft 42 and the rotor 54. Similarly, there is provided a ring gear 80 which is fixed to the outboard side of the other rotor 56 concentric with this rotor's axis 60 and meshing with an externally toothed gear 82 which is integral with the inboard end of sleeve bearing 48 with these gears having the same ratio as the other timing gears 76 and 78 and their point of mesh spaced 180° relative thereto.

Figure 3:
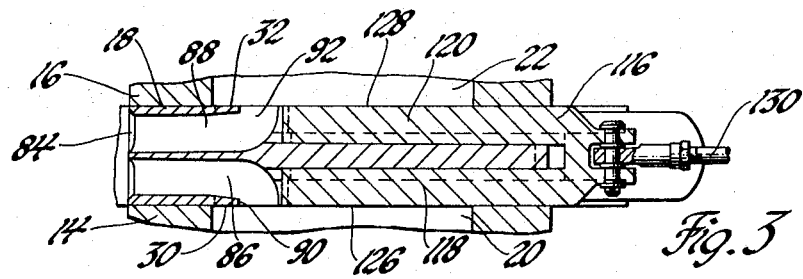
FIG. 3 is a view of the output power control apparatus taken on the line 3—3 in FIG. 2 with such apparatus shown in the maximum power position.

Referring to FIGS. 2 and 3, the engine has an induction system comprising an intake passage 84 that extends through the intermediate housing 18 and divides into two branches 86 and 88 that turn in axially opposite directions and are open at axially aligned intake ports 90 and 92 in side walls 30 and 32 to rotor cavities 20 and 22, respectively, this porting to the cavities being located to one side of the minor axis 38 and to one side of the major axis 40. The intake passage 84 connects the cavities 20 and 22 with an intake manifold 94 which intakes air through an air cleaner 96 as shown in FIG. 2. Fuel is provided by a conventional fuel injection system 98 having a fuel injector 100 that injects fuel into the air flowing through the intake manifold 94 to the intake passage 84. Combustion by spark ignition is provided by a conventional ignition system 102 having spark plugs 104 and 105 which are mounted in the rotor housings 14 and 16 on the same side of the minor axis 38 as the intake ports 90 and 92 but on the opposite side of the major axis 40 so that they are available to provide a spark in the working chambers 66 and 68 at the proper time for combustion. The exhaust products of combustion are exhausted from each working chamber by exhaust passages 106 and 108 which extend through the peripheral walls 24 and 26 of the rotor housings 14 and 16 to the respective cavities 20 and 22 on the same side of the major axis 40 as the intake ports 90 and 92 but on the opposite side of and near the minor axis 38.

Figure 5A:
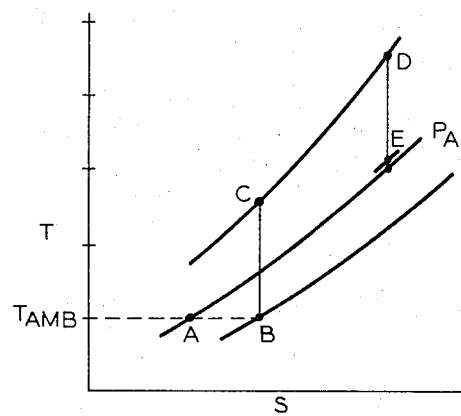
FIGS. 5a and 5b are temperature (T) - entropy (S) and pressure (P) - volume (V) diagrams, respectively, of the rotary combustion engine in FIG. 1 when operating with a conventional carburetor at part throttle.
Figure 5B:
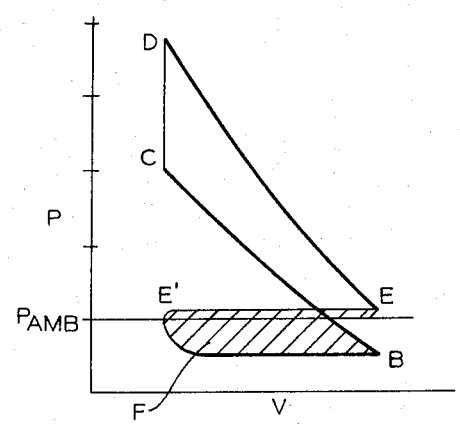

In order to clearly illustrate the differences and advantages provided by the present invention, there will now be described a typical operation of the engine structure assuming that the intake ports 90 and 92 are of constant open area of the size shown shaded in FIG. 2 and that instead of the fuel injection system there is a conventional carburetor providing a throttled air-fuel flow. As each of the rotors 54 and 56 turn in the direction of the arrow in FIG. 2, each of the working chambers is periodically connected to draw in air-fuel mixture by the inboard side of the associated rotor uncovering or opening the associated intake at or near the initiation of expansion of this chamber and closing off this intake port to this chamber at or near the end of this intake phase prior to subsequent compression. The air-fuel mixture trapped in this working chamber is then compressed and when the rotor is near or at top dead center for this chamber, which occurs when the rotor face of this chamber is opposite the associated spark plug, this mixture is ignited by this spark plug. With ignition of the mixture in this chamber, the peripheral wall takes the reaction forcing the rotor to continue turning while the gas is expanding. Eventually the leading apex seal of this chamber passes the associated exhaust passage so that the burned gas mixture in this chamber is expelled to the exhaust system or atmosphere to complete the cycle. These phases of intake, compression, expansion, and exhaust are diagrammed in FIGS. 5a and 5b and describe a part throttle or part load condition. For simplicity, both compression and expansion have been assumed to occur isentropically and heat addition has been assumed to occur at constant volume. In these diagrams, the intake phase which occurs across the carburetor throttle is depicted as being from point A to B and determines the mass of charge or mixture that is trapped in the working chamber. Compression occurs between points B and C, heat addition occurs between points C and D and expansion down to near ambient pressure occurs between points D and E. A slight pressure differential is required to force out the exhaust gases and this is illustrated in the diagram between the points E and E*f*. The shaded area F in the P – V diagram in FIG. 5*b* represents the pumping work.

Describing now the details of the power control according to the present invention, each of the intake ports 90 and 92 instead of having a constant area which is open to each working chamber only during the intake phase, is instead made variable and is not only open to each working chamber during the intake phase, but is also openable to this same chamber during the immediately subsequent compression phase so that a portion of the air-fuel mixture or charge which otherwise would have been trapped is forced or rejected back into the intake passage and as a result, the power is thereby controlled while the pumping work is reduced. The power control means according to the present invention comprises elongating each of the intake ports 90 and 92 in the direction of rotor movement as shown in FIG. 2. In the elongated portion of each of the intake ports 90 and 92 there are opposite intake port sides 110 and 111, respectively, which extend parallel to each other to the upper lobes 112 and 113 of the peripheral walls 24 and 26 and at an angle relative to the major axis 40 such that the ports 90 and 92 remain open to each of the working chambers even though the inboard rotor sides are covering the shaded area of the intake ports previously described. Thus, each of the intake ports 90 and 92 is openable to each of the respective working chambers while this chamber is undergoing compression and is also open to the next advancing working chamber which is then undergoing expansion in its intake phase.

Figure 4:
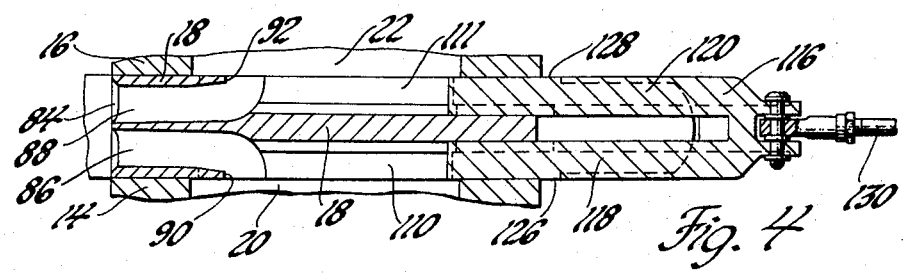
FIG. 4 is a view similar to FIG. 3 but showing the power output control apparatus in the minimum power position.

Variable intake port closing control is provided by controlling the size of opening or area of these elongated intake ports 90 and 92 by a fork-shaped slidable member 116. The intake port area control member 116 has parallel extending port area control arms 118 and 120 which are T-shaped in cross-section as shown in FIG. 1 and are slidably received in correspondingly T-shaped grooves 122 and 124 formed in the intermediate housing 18 coextensive with the elongated portions of the intake ports 90 and 92. The arms 118 and 120 have faces 126 and 128 that are flush with the intermediate housing side walls 32 and 30, respectively, so that the inboard side seals on the respective rotors slide smoothly thereover. The slide member 116 is operatively connected by accelerator linkage 130 to a pivotally mounted accelerator pedal 132 which is depressable from a release position shown in dash line to the position shown in solid line against the bias of a spring 134 by the vehicle operator, the throttle pedal 132 having a stop 136 that is engageable with an abutment on the pedal's support 138 to determine the accelerator pedal release position. In the accelerator pedal release position, the slide member 116 is positioned in its minimum power position as shown in dash line in FIG. 2 and solid line in FIG. 4. In the minimum power position the intake ports 90 and 92 are opened by the port area control arms 118 and 120 to their maximum extent in the direction of rotor movement and are thus in their maximum open area condition in which the intake passage 84 remains open to the working chambers late into their compression phase. When the accelerator pedal 132 is depressed by the operator to move the slide member 116 to its maximum power position as shown in solid line in FIG. 2 and also in FIG. 3, the port area control arms 118 and 120 are thereby moved to decrease the size of the opening of the intake ports 90 and 92 until only the shaded intake port area remains wherein the intake passage 84 is open to the respective working chambers only during their intake phase. In the operation of the rotary combustion engine with the power control according to the present invention, the slide member 116 is thus controlled by the operator to time the intake ports to close during the compression phase to obtain minimum power with this intake port closing being advanced toward the intake phase to increase power.

Figure 6A:
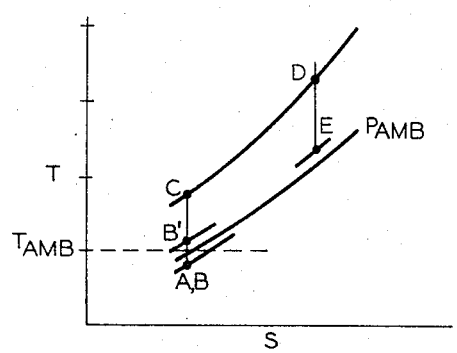
FIGS. 6a and 6b are temperature - entropy and pressure - volume diagrams, respectively, of the rotary combustion engine in FIG. 1 when operating with the power control according to the present invention at intermediate power output or part load.
Figure 6B:
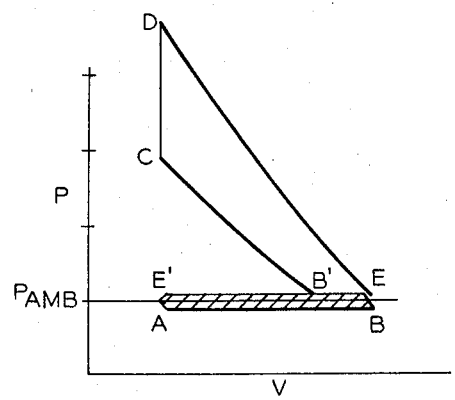

FIGS. 6*a* and 6*b* illustrate the effect of closing the intake ports 90 and 92 late in the compression phase to meet part load. In this instance each of the intake ports 90 and 92 open as normal at A and remain open throughout the intake phase to B and into the immediately subsequent compression phase during which part of the air-fuel mixture is forced or rejected between the points B and B' back to the intake. Thereafter, the trapped mixture is compressed between the points B' and C, heat is added between the points C and D and expansion occurs between the points D and E with exhaust being forced out by the slight pressure difference as illustrated between the points E and E'. The pumping is illustrated by the shaded area in FIG. 6*b* which is considerably less than that compared to the throttled engine depicted by the diagrams in FIGS. 5*a* and 5*b*. Thus, for the same heat addition, the net output work is larger and therefore the thermal efficiency is higher. Also, the temperatures throughout the cycle are lower, leading to lower NO production. Furthermore, this result is enhanced by the higher efficiency; that is, by improving efficiency the required heat addition for a specific output is reduced, further reducing the peak-cycle temperature. For example, it has been determined that at 2,200 rpm and about 50 percent load, indicated thermal efficiency is increased by about 10 percent and peak temperature lowered by about 60°K. To increase the engine power to meet increasing load, the slide member 116 is then operated to decrease the effective intake port areas to the point where the intake ports are closed to the working chambers prior to the compression phase in which case the engine develops maximum power and operates like a conventional rotary engine without intake port closing timing control.

It will be further appreciated that with the absence of a throttle, the intake system remains at essentially ambient pressure even at part load conditions. Furthermore, there is provided improved charge preparation at part load conditions as the result of the better mixture homogeneity that results from the discharge of a portion of the charge back into the intake system.

The above described embodiment is illustrative of the invention which may be modified within the scope of the appended claims.

We claim:

1. A rotary combustion engine comprising a housing having opposing side walls and a peripheral wall providing a cavity, a rotor disposed in said cavity, an output shaft rotatably supported by said housing and having an eccentric rotatably supporting said rotor, said rotor and said housing cooperatively providing a plurality of variable volume working chambers spaced around said rotor that move with said rotor within said housing as said rotor and said output shaft turn, said housing having an intake passage with an intake port through one of said side walls that is opened by said rotor to each said working chamber during a chamber expansion phase as said rotor planetates and is also openable by said rotor to the same working chamber during an immediately subsequent chamber contraction phase as said rotor continues to planetate, said housing having an exhaust passage that is opened by said rotor to each said working chamber during a subsequent chamber contraction phase as said rotor continues to planetate, and intake port control means including valve means slidably mounted in said housing for controlling the extent of opening of said intake port, said valve means having a valve face in said intake port that remains flush with said one side wall while sliding between a maximum power position in which said intake port has a minimum extent in the direction of rotor movement and is open to each said working chamber only during chamber expansion and a minimum power position in which said intake port has a maximum extent in the direction of rotor movement and remains open to the same working chamber during immediately subsequent chamber contraction.

2. A rotary combustion engine comprising a housing having opposing interior side walls and an interior peripheral wall providing a cavity, a rotor disposed in said cavity, an output shaft rotatably supported by said housing and having an eccentric rotatably supporting said rotor, said rotor and said housing cooperatively providing a plurality of variable volume working chambers spaced around said rotor that move within said rotor within said housing as said rotor and said output shaft turn, said housing having an intake passage with an intake port through one of said side walls that is opened by said rotor to each said working chamber during a chamber expansion phase as said rotor planetates and is also openable by said rotor to the same working chamber during an immediately subsequent chamber contraction phase as said rotor continues to planetate, said housing having an exhaust passage that is opened by said rotor to each said working chamber during a subsequent chamber contraction phase as said rotor continues to planetate, and intake port control means including valve means slidably mounted in said housing for controlling the extent of opening of said intake port, said valve means having a valve face in said intake port that remains flush with said one side wall and operates to vary the area of said intake port at the opening to said cavity while sliding between a maximum power position in which said intake port has a predetermined open area and a minimum extent in the direction of rotor movement and is open to each said working chamber only during chamber expansion and a minimum power position in which said intake port has a predetermined larger open area and a maximum extent in the direction of rotor movement and remains open to the same working chamber during immediately subsequent chamber contraction, manually controlled linkage means for moving said valve means from said minimum power position to said maximum power position, biasing means for biasing said valve means to said minimum power position.

3. A rotary combustion engine comprising a housing having a pair of cavities each with opposing side walls and a peripheral wall, a rotor disposed in each said cavity, an output shaft rotatably supported by said housing and having an eccentric rotatably supporting each said rotor, each said rotor and said housing cooperatively providing a plurality of variable volume working chambers spaced around each said rotor that move with each said rotor within said housing as each said rotor and said output shaft turn, said housing intermediate said cavities having an intake passage with a pair of intake ports through the adjacent side walls of said cavities that are opened by said rotors to each of the associated working chambers during a chamber expansion phase as each said rotor planetates and are also openable by each said rotor to the same working chamber during an immediately subsequent chamber contraction phase as each said rotor continues to planetate, said housing having an exhaust passage that is opened by said rotors to each of the associated working chambers during a subsequent contraction phase as each said rotor continues to planetate, and intake port control means including valve means slidably mounted in said housing for controlling the extent of opening of said intake ports, said valve means having valve faces in said intake ports that remain flush with the associated side walls and operate to vary the area of both said intake ports at the openings to said cavities while sliding between a maximum power position in which said intake ports have a predetermined open area and a minimum extent in the direction of rotor movement and is open to each said working chamber only during expansion and a minimum power position in which said intake ports have a predetermined larger open area and a maximum extent in the direction of rotor movement and remain open to the same working chamber during immediately subsequent chamber contraction.

\* \* \* \* \*